United States Patent [19]

Croman et al.

[11] Patent Number: 5,077,125

[45] Date of Patent: * Dec. 31, 1991

[54] HIGH PERFORMANCE ARAMID MATRIX COMPOSITES

[75] Inventors: Robert B. Croman, Drexel Hill, Pa.; Hamid M. Ghorashi, Midlothian, Va.; Gurdial Singh, Hockessin, Del.

[73] Assignee: E. I. Du Pont de Nemours and Company, Wilmington, Del.

[*] Notice: The portion of the term of this patent subsequent to Mar. 19, 2008 has been disclaimed.

[21] Appl. No.: 631,265

[22] Filed: Dec. 20, 1990

Related U.S. Application Data

[63] Continuation-in-part of Ser. No. 508,877, Apr. 12, 1990, Pat. No. 4,999,395.

[51] Int. Cl.$^5$ ................................................ B32B 9/00
[52] U.S. Cl. .............................. 428/367; 427/430.1; 427/443.2; 428/375; 428/395; 528/183; 528/184; 528/185; 528/211; 528/323; 528/329.1; 528/331; 528/367
[58] Field of Search ............... 428/367, 375, 395; 528/324, 329.1, 331, 183, 184, 185, 211, 323, 367; 427/430.1, 443.2

[56] References Cited

U.S. PATENT DOCUMENTS

| | | | |
|---|---|---|---|
| 3,753,998 | 8/1973 | Morello | 260/30.2 |
| 3,759,877 | 9/1973 | Huhy et al. | 260/78 A |
| 3,983,306 | 9/1976 | Nielinger et al. | 428/474 |
| 4,081,430 | 3/1978 | Minami | 260/78 |
| 4,398,012 | 8/1983 | Merrill et al. | 528/324 |
| 4,681,911 | 7/1987 | Chang | 524/607 |

FOREIGN PATENT DOCUMENTS

| | | |
|---|---|---|
| 0307993 | 3/1989 | European Pat. Off. |
| 4519714 | 7/1970 | Japan . |
| 57-114575 | 7/1982 | Japan . |

OTHER PUBLICATIONS

Synthesis of Alpha-Alkyl-or Aryl-N-(Omega-Amino-tetramethylene)-Upsil On-Valerolactams and Corresponding Bislactams, Ann. Khim ZH, 1974, 27 (10) 868-871.

High Performance Composite of J-2 Thermoplastic Matrix Reinforced with Kevlar ® Aramid Fiber, Proceedings of International Sampe Symposium, vol. 33, 1988.

Primary Examiner—Morton Foelak

[57] ABSTRACT

Thermoprocessible aramid matrix polymer based composites have high flex and short beam shear strengths and low moisture uptake.

2 Claims, No Drawings

HIGH PERFORMANCE ARAMID MATRIX COMPOSITES

RELATED APPLICATION

This application is a continuation-in-part of our pending application Ser. No. 07/508,877, filed Apr. 12, 1990 U.S. Pat. No. 4,999,395.

BACKGROUND OF THE INVENTION

From a fabrication point of view, it is desirable to have high performance composites prepared from thermoplastic matrix resin with fiber reinforcement such as p-aramid, carbon and glass. As compared to thermoset type matrix resins, such as epoxies and polyesters, the thermoplastics are thermoprocessible and in general, avoid the emission of undesirable solvents. However, the thermoset resins offer certain qualities that are important to high performance composites such as high Tg, high flex strength, high short beam shear and low moisture uptake. An object of the present invention is to provide a high performance composite from a thermoplastic resin whose properties are about equivalent to or exceed those of the thermoset matrix type composites.

SUMMARY OF THE INVENTION

This invention provides a high performance composite of a copolyamide of the following units:

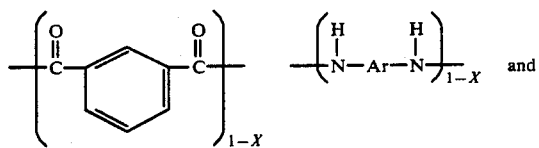

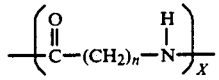

where n is 4 or 5; X is from 0.01 to 0.50, preferably from 0.03 to 0.30, and Ar is a radical selected from 3,4'-oxydiphenylene, 4,4'-oxydiphenylene, 1,3-phenylene, 1-methyl-2,4-phenylene, and mixtures of such radicals with each other or with up to equimolar amounts of 1,4-phenylene radicals; reinforced with from about 10 to 90%, preferably 30 to 70%, by volume of fiber selected from the group of glass, carbon and aramid fiber.

DETAILED DESCRIPTION OF THE INVENTION

The fiber reinforcement in composites of the invention can be continuous filaments or staple fiber (cut lengths of varying or fixed lengths). The continuous filament reinforcement used with this invention for structural applications are glass, carbon or aramid filaments, preferably p-aramid filaments. The term "p-aramid" is used to designate aromatic polyamides whose chain extending bonds are either coaxial or parallel and oppositely directed. Useful p-aramids include poly(p-phenylene terephthalamide) (PPD-T) as well as copolymers thereof which yield high strength, high modulus filaments. Other aramid fibers such as poly(m-phenylene isophthalamide) (MPD-I) fibers, especially crystalline MPD-I staple fibers (T-450 Nomex ® aramid fibers having a cut length of 3.8 cm and a linear density of 1.65 decitex, manufactured by E. I. du Pont de Nemours and Company) may also be employed. Glass fiber such as a high strength E-glass, a lime-borosilicate glass derived from a Pyrex ® composition, manufactured by Owens-Corning Fiberglass Corporation can be used as yarn or woven fabric reinforcement. High-strength PAN-based carbon fiber (AS-4 produced by Hercules Incorporated) has been used as have other carbon fiber in yarn or in woven form. The p-aramid filaments employed in Examples 1-3 are finish-free, zero-twist, poly(p-phenylene terephthalamide) filaments (1420 denier, 1000 filament Kevlar ® 49 aramid yarn manufactured by E. I. du Pont de Nemours and Company).

The composites may be prepared by any of a variety of techniques. Thus, the fiber may be combined with matrix polymer by solution coating; by melt-extruding polymer over yarn; by cowinding filaments of matrix polymer with reinforcing filaments into a sheet and melting the matrix polymer filaments to form the matrix; by depositing the matrix polymer powder on a warp of the reinforcing filaments and melting to provide matrix; by extruding molten matrix polymer onto a warp of the reinforcing filaments; by applying films of matrix polymer to both sides of a warp of the reinforcing filaments; etc. A plurality of such reinforced yarns or sheets can be stacked or combined and formed under heat and pressure into a shaped reinforced structure. Similar techniques can also be employed to combine the thermoplastic matrix with a fabric of glass, carbon or aramid filaments.

From about 30 to 70 volume percent of reinforcing filaments are normally employed in the composites to achieve maximum properties although lesser amounts will also exhibit the improvements contemplated herein.

The polymer matrix system employed in the present invention is a copolyamide having the following units:

Formula I

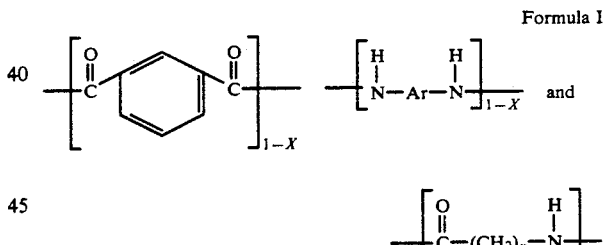

where n is 4 or 5; X is from 0.01 to 0.50, preferably from 0.03 to 0.30, and Ar is a radical selected from 3,4'-oxydiphenylene, 1,3-phenylene, 1-methyl-2,4-phenylene, and mixtures of such radicals with each other or with up to equimolar amounts of 1,4-phenylene radicals. Its preparation is described in copending and coassigned U.S. application Ser. No. 07/402,295. Preferred is the polymer in which Ar is 3,4'-oxydiphenylene and the aliphatic unit is

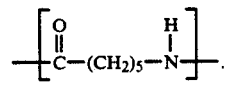

The polymer in which Ar is 3,4'-oxydiphenylene, n is 5, and x is in the range of about 0.18 to 0.25 is referred to below as Polymer A. It has an inherent viscosity of 1-1.1. Small amounts of lactam are present as a result of the way the polymer is prepared, however, for use in the examples below, the lactam was extracted from the polymer before use. Also, the aliphatic content of Polymer A was about 7.5 to 10.5 wt. %.

For composites of this invention appearing in Examples 1-3 below, the matrix polymer was first dissolved in dimethylacetamide (DMAc) to 4 wt. % polymer. The yarn bundle was then passed through this solution for a pick-up of 10% by wt. of polymer with respect to yarn weight. The coated fiber was dried to drive off the solvent and aligned to form pre-preg tapes of unidirectionally aligned fibers. Additional polymer may be applied to build-up the resin content to the desired value in the final composite laminate. One method of polymer build-up is to wrap the coated fiber around a flat plate with a polymer film inserted between successive wrappings of the plate. The thickness of the film is dictated by the desired matrix polymer volume loading. The wrapped plate is subjected to consolidation conditions of about 300° C., about 3800 kPa (550 psi) and a nitrogen purge to form two 15.2 cm by 15.2 cm (6 in. by 6 in.) prepreg tapes. The pressure and heat was applied by a hydraulic platen press. Other ways to build up resin volume are well known to those skilled in the art.

Next, the composite is prepared by lay up of the prepreg plies in a mold to the desired fiber orientations, e.g., unidirectional, cross-ply, etc. and consolidation under heat and pressure as with a hydraulic platen press. The conditions used were about 300° C. at about 1380 kPa (200 psi) for about 15 minutes with an optional nitrogen purge. The resulting composite laminates were of good quality and appearance.

Test Procedures

The composite panels were cut into 15 cm×1.3 cm (6"×½") strips and subjected to flexural modulus, flexural strength and short beam shear (SBS) testing as described in ASTM D2344 and D790 testing procedures. Water absorption was determined by weighting the samples at ambient conditions, placing the samples in 71° C. water for 13-14 days, then reweighing the samples and calculating the percent water uptake. The glass transition temperature (Tg) was determined by use of differential scanning calorimetry (DSC) in accordance with ASTM D3418.

Definitions

In the examples, matrix Polymer A is as defined above. Polymer B is metaphenylene isophthalamide (MPD-I) and Polymer C is a copolymer of metaphenylene diamine with a 70/30 mixture of isophthalic (I) and terephthalic (T) acids. Polymer D is an amorphous copolyamide corresponding to Composition No. 3 in Table 1 of U.S. Pat. No. 4,681,911. Polymer E is a commercially available epoxy resin such as 3501-6 sold by Hercules, Inc.

The Tg of the various matrix polymers is reported in the following table.

| Matrix Polymer | Tg |
| --- | --- |
| A | 205 |
| B | 266 |
| C | 200 |
| D | 167 |
| E | 206 |

The following examples, except for the controls are illustrative of the present invention and are not intended as limiting.

EXAMPLE 1

This example compares the flexural performance and short beam shear (interlaminar shear strength) performance of a number of matrix polymers reinforced with continuous paraphenylene terephthalamide (PPD-T) filaments (Kevlar ® 49 aramid fiber). The fiber is aligned in a unidirectional manner to give the best values of strength. The results are presented in Table 1.

TABLE 1

| Fiber Matrix | Fiber Loading Vol. % | Flex Strength MPa (kpsi) | SBS MPa (kpsi) |
| --- | --- | --- | --- |
| A | 61 | 724 (105) | 61 (8.9) |
| B | 67 | 593 (86) | 38 (5.5) |
| C | 67 | 627 (91) | 35 (5.1) |
| D | 60 | 696 (101) | 59 (8.5) |
| E | 60 | 655-689 (95-100) | 59 (8.6) |

As can be seen the Polymer A matrix system reinforced with PPD-T fiber gives properties on a par with, to slightly better than the thermoset epoxy system E and thermoplastic matrix system D and is significantly better than the aramid matrix B based composite system.

EXAMPLE 2

This example compares the moisture uptake of PPD-T filament reinforced Polymer A matrix composite with composites based on several other polymer matrices. The values are given in Table 2.

TABLE 2

| Polymer Matrix | % Moisture Uptake |
| --- | --- |
| A | 1.3 |
| B | ≧4.0 |
| C | 4.0 |
| D | ~2.0 |
| E | 2.0 |

As can be seen the Polymer A matrix composite takes up the least amount of water. The moisture uptake conditions employed in testing the Polymer C matrix system was exposure to 95% relative humidity at 82° C. for 21 days and conditions employed in testing the Polymer D matrix system was exposure at 80% relative humidity at 82° C. for 21 days. It should be noted that these differ from those conditions used for the Polymer A matrix system. The moisture uptake performances of Polymers B and E are well known.

EXAMPLE 3

The importance of moisture uptake is evident in the retention of mechanical properties. Table 3 compares the flexural strength of Polymer A matrix and Polymer D matrix reinforced with PPD-T fiber and calculates the percent retention of the strength after the conditioning mentioned in Example 2. The room temperature flex strength before conditioning is taken as the reference state and the flex strength at 93° C. is compared to the reference state.

TABLE 3

Comparison of Elevated Temperature Flex Strength After Conditioning vs. Room Temperature Flex Strength Prior to Conditioning

| Matrix | Flex Strength R.T. Before Conditioning MPa (kpsi) | Flex Strength 93° C. After Conditioning MPa (kpsi) | Strength Retention % |
| --- | --- | --- | --- |
| A | 662 (96) | 483 (70) | 74 |
| D | 696 (101) | 441 (64) | 63 |

As can be seen, the Polymer A matrix system retains significantly more of its flex strength after conditioning and elevated temperature testing than does the Polymer D matrix system.

EXAMPLE 4

A carbon fiber composite was made from Polymer A and AS-4 fiber. No efforts were taken to remove the finish from the carbon fiber. The volume loading of the composite was ~49% and the flexural and interlaminar properties are listed in Table 4.

TABLE 4

AS-4 Carbon Fiber Reinforced Polymer A Matrix Mechanical Properties

| | | |
| --- | --- | --- |
| Flex Modulus | 113 GPa | (16.4 Mpsi) |
| Flex Strength | 1296 MPa | (188 kpsi) |
| SBS | 72 MPa | (10.5 kpsi) |

If the flex modulus and flex strength are normalized to 60% fiber v/o then the properties are comparable to other systems such as those based on Polymer D or epoxy matrices.

TABLE 5

AS-4 Carbon Fiber Reinforced Polymers

| Property | Polymer A Exp. | Polymer A Normalized | Polymer D | Epoxy |
| --- | --- | --- | --- | --- |
| Fiber v/o, % | 49 | @ 60 | ~60 | ~60 |
| Flex Modulus, GPa (Mpsi) | 113 (16.4) | 138 (20) | 103–138 (15–20) | 103–138 (15–20) |
| Flex Strength MPa (kpsi) | 1296 (188) | 1586 (230) | 1310–1448 (190–210) | 1517 (220) |

EXAMPLE 5

A sample of Polymer A, vacuum extracted so that it contained less than 6% residual free caprolactam, was fed through a single screw melt extruder and a yarn of continuous MPD-I filaments having an individual filament linear density of 1.65 decitex and a yarn linear density of 132 tex was fed through a die to coat the filaments. The yarn was dried in an oven at 120° C. for 48 hours to lower the moisture content to less than 2%. The yarn linear speed, die size, and extruder screw speed were varied to obtain the desired melt coating thickness and quality. The yarn linear speed was varied from 6.1 m/min (20 ft./min) to 30.5 m/min (100 ft./min.). It was concluded that 15.2 m/min (50 ft./min.) was the optimum linear speed for coating uniformity and filament bundle coverage. The initial yarn thickness was about 0.41 mm (16 mils) and enough coating was applied in the melt extrusion process to increase the bundle thickness to 0.91 mm (36 mils). The Polymer A matrix resin was extruded with an extruder temperature profile of 277° C. (530° F.) to 291° C. (555° F.), a die temperature of 285° C. (545° F.), and a polymer melt temperature of 308° C. (587° F.) at the point of extrusion onto the filaments. The fact that the temperature at the point of extrusion was higher than the die melt temperature indicated that there was heat generation in the die owing to significant melt viscosity of the matrix resin.

The procedure was repeated, except that a yarn of continuous PPD-T filaments having an individual filament linear density of 1.65 decitex and a yarn linear density of 330 tex was used in place of the yarn of continuous MPD-I filaments. The initial yarn thickness was about 0.91 mm (36 mils) and enough coating was applied in the melt extrusion process to increase the bundle thickness to 1.32 mm (52 mils). The Polymer A matrix resin was extruded with an extruder temperature profile of 249° C. (480° F.) to 266° C. (510° F.), a die temperature of 260° C. (500° F.), and a polymer melt temperature of 282° C. (540° F.) at the point of extrusion onto the filaments. The linear speed of the filament bundle was 6.1 m/min (20 ft./min).

The coated filament bundles from the above procedures could be cut into flakes having a size of about 0.3 cm to 1.3 cm for extrusion or compression molding.

EXAMPLE 6

A matrix polymer according to formula I in which Ar was 3,4'-oxydiphenylene, n was 4, x was about 0.093, and the inherent viscosity was about 1.1 was used to make a unidirectional composite reinforced with PPD-T continuous filaments. The volume loading of the resulting composite was nominally 60%, and the glass transition temperature was 230° C.

EXAMPLE 7

A thin composite was made by sandwiching a piece of graphite fabric between two sheets of film of Polymer A. This combination was subjected to approximately 200 psi pressure at 300° C. for 15 minutes. The resulting laminate was approximately 0.4 mm (15.6 mils) thick and had good appearance. The graphite fiber was of the AS-4 variety and the weave was a 4-harness satin (crows foot).

EXAMPLE 8

A unidirectional composite was prepared from E-glass as reinforcement in a matrix resin similar to that used in Example 1. The fiber was coated with matrix resin by dipping a glass fiber bundle in a dilute solution. The coated fiber was wound on a card and more solution applied to build up the resin loading. The resulting card wound tapes were laid in a closed mold and consolidated under heat and pressure to form a laminate composed of unidirectional plies. The fiber column was about 62%. The composite exhibited the following properties:

Flex modulus—47.6 GPa (6.9 Mpsi)
Flex strength—1470 MPa (212.8 kpsi)
SBS—87.6 MPa (12.7 kpsi)

EXAMPLE 9

In this example a matrix polymer according to Formula I was made in which n was 5, Ar was a mixture of 70% m-phenylene and 30% p-phenylene, x was 0.27, and the inherent viscosity was 0.8. This matrix polymer was used to make a unidirectional composite reinforced with graphite continuous filaments. The composite so made had excellent short beam shear and flexural performance.

Into a two-liter resin kettle fitted with a stirrer and heating mantle was placed a mixture of N,N'-isophthaloyl bis-caprolactam (862.5 g, 2.4 mol), m-phenylenediamine (183.2 g, 1.7 mol), and p-phenylenediamine (78.5 g, 0.73 mol). The mixture was maintained under a continuous nitrogen flow at a temperature between 250° and 260° C. for four hours. The product was a clear amber plasticized copolymer in solution with 34.3% caprolactam by weight. The inherent viscosity of the copolymer was determined to be 0.8, its Tg was 217° C., and the value of x in the formula of the composition was determined from its proton-NMR spectrum using the method described in U.S. patent application Ser. No. 07/402,295, filed 9/5/89.

A solution of the above copolymer was prepared by combining about 200 g of the plasticized copolymer with about 1500 g of DMAc and shaking them together at room temperature until a clear, light brown/gold solution was obtained. In each of a series of batch runs, a Waring 7011 blender was filled with about 250 mL of distilled water. With the blender run on high speed, about 50 mL of copolymer solution was poured slowly into the blender into the agitated aqueous solution. The product formed was a powder, which was filtered and washed with about 500 mL of water and dried in a 110° C. vacuum oven.

A total of 140 g of the copolymer powder made in this manner was combined to be used as the matrix polymer to make the unidirectional composite. The density of the copolymer was 1.2965 g/mL, and it was found to contain 0.18 wt. % free caprolactam. A solution containing 4 wt. % of the copolymer in DMAc was prepared. High strength PAN-based carbon fiber yarn (AS-4 yarn, Hercules Incorporated) was passed though the solution of the copolymer for a pick-up of 7% by wt. of copolymer with respect to yarn weight. The coated yarn was dried to drive off the solvent and aligned to form twelve 15.2 cm×15.2 cm (6 in.×6 in.) prepreg tapes. The loading of the copolymer on the yarn was increased by additional coating so that the final fiber/copolymer content was 60/40 on a weight basis. A unidirectional composite was then made from the twelve prepreg plies at a maximum temperature of 300° C. and a maximum pressure of 83,000 kPa (12,000 psi).

The composite exhibited the following properties:
Flex modulus—131 GPa (19 Mpsi)
Flex strength—1860 GPa (270 Kpsi)
SBS—103-124 (15-18 Kpsi).

We claim:

1. An aramid, carbon or glass fiber coated with a polymer consisting essentially of a copolyamide of the following units:

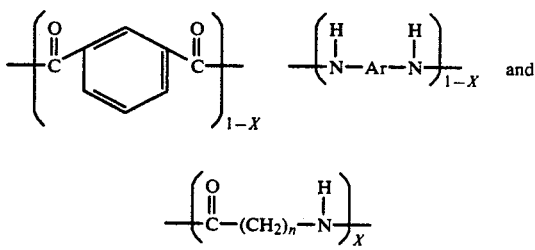

and

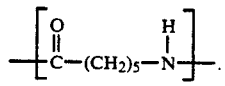

where n is 4 or 5; X is from 0.01 to 0.50, preferably from 0.03 to 0.30, and Ar is a radical selected from 3,4'-oxydiphenylene, 4,4'-oxydiphenylene, 1,3-phenylene, 1-methyl-2,4-phenylene, and mixtures of such radicals with each other or with up to equimolar amounts of 1,4-phenylene radicals.

2. An aramid fiber according to claim 1 in which Ar is 3,4'-oxydiphenylene and the aliphatic unit is $$\left[ \begin{matrix} O & & H \\ \| & & | \\ -C-(CH_2)_5-N- \end{matrix} \right].$$

* * * * *